Dec. 23, 1958  R. E. GARFIELD  2,865,427
SLIDING AUTOMOBILE SEAT ATTACHMENT
Filed May 10, 1957
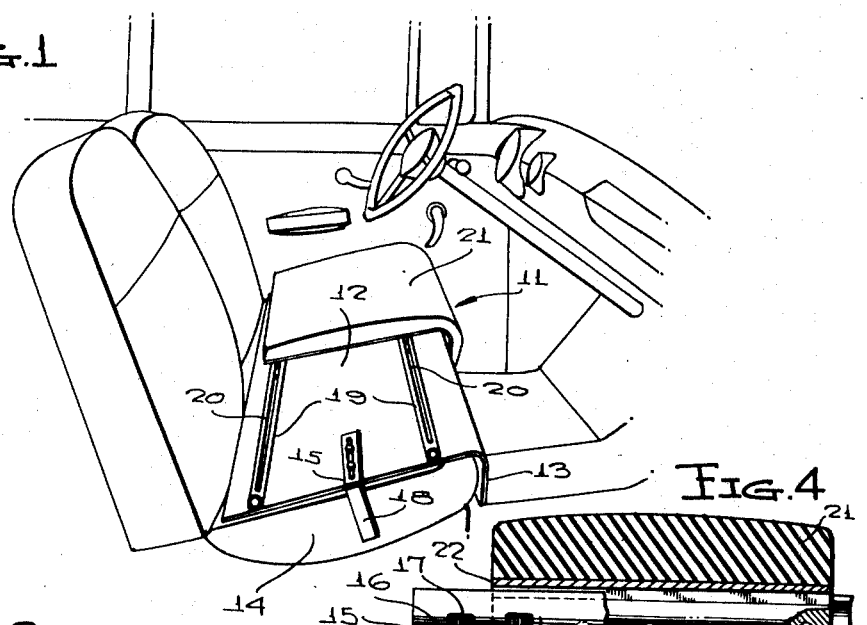
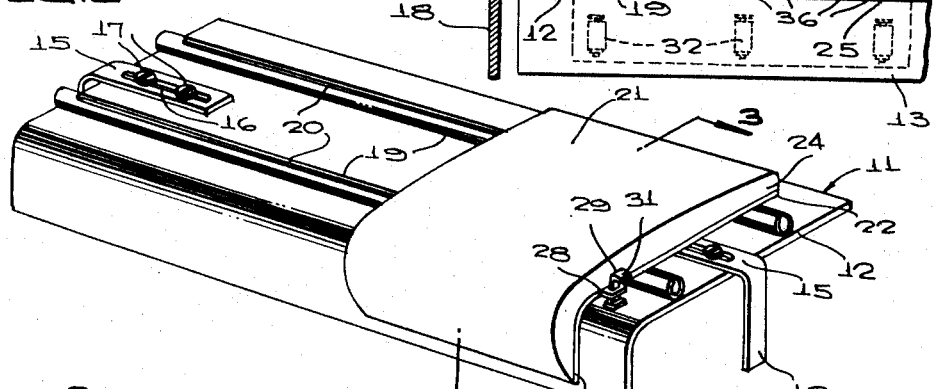
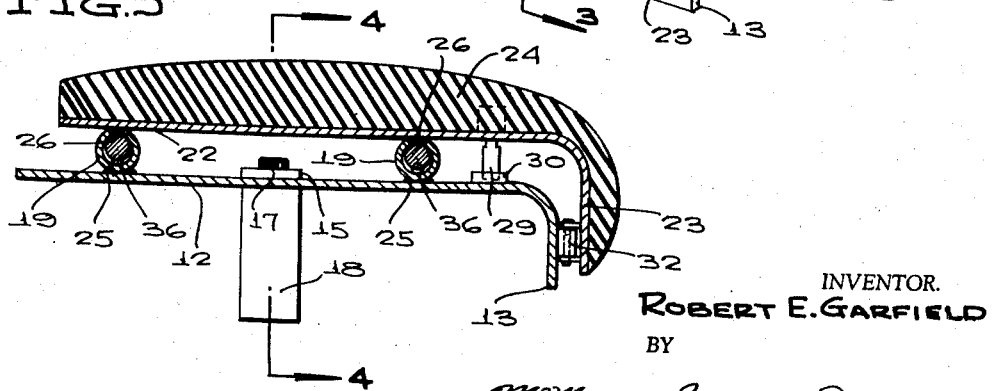
INVENTOR.
ROBERT E. GARFIELD
BY
McMorrow, Berman & Davidson
ATTORNEYS

United States Patent Office 2,865,427
Patented Dec. 23, 1958

2,865,427

SLIDING AUTOMOBILE SEAT ATTACHMENT

Robert E. Garfield, Homestead, Fla.

Application May 10, 1957, Serial No. 658,341

2 Claims. (Cl. 155—5)

This invention relates to motor vehicle seats, and more particularly to a sliding seat attachment for an automobile.

The main object of the invention is to provide a novel and improved sliding seat attachment for a motor vehicle, said attachment being simple in construction, being easy to install, and providing a means whereby the driver of the vehicle may quickly shift his position from the left side of the vehicle to the right side thereof and back again, so as to facilitate the movement of the driver of the vehicle to a position adjacent the right door of the vehicle so that he may quickly leave the vehicle and quickly return thereto and resume driving position therein.

A further object of the invention is to provide an improved sliding seat attachment for a motor vehicle, said attachment involving simple parts, being inexpensive to construct, being durable, and being readily adjustable to fit various designs of motor vehicles.

Further objects and advantages of the invention will become apparent from the following description and claims, and from the accompanying drawings, wherein:

Figure 1 is a perspective view of the front seat of a motor vehicle provided with an improved sliding seat attachment constructed in accordance with the present invention.

Figure 2 is a perspective view of the sliding seat attachment employed in Figure 1, shown from a different angle.

Figure 3 is an enlarged vertical cross sectional view taken on the line 3—3 of Figure 2.

Figure 4 is a fragmentary vertical cross sectional view taken on the line 4—4 of Figure 3.

Referring to the drawings, the sliding seat attachment is designated generally at 11 and comprises a rigid plate support member 12 substantially equal in area to the seat portion of the seat of a motor vehicle and adapted to be disposed thereover, the plate member 12 being formed with a depending front flange 13 at one longitudinal side adapted to abut against the front edge of the seat, for example, the motor vehicle seat 14 shown in Figure 1. The plate support member 12 is devoid of a back adapted to fit over the back portion of the seat of a motor vehicle, as a back would interfere with tilting of the seat back portion of the motor vehicle seat. Respective adjustable angle brackets 15, 15 are provided at the opposite marginal portions of the plate member 12, said brackets being provided with slots 16 through which clamping screws 17, 17 are engageable, said clamping screws being threaded into the rigid supporting plate 12 and being adapted to clamp the brackets 15 in adjusted positions on the supporting plates. Each of the brackets is provided with a depending vertical arm 18, the arms 18 being engageable against the ends of the motor vehicle seat 14 to hold the support plate 12 against shifting laterally in the vehicle after the plate has been installed on the seat.

As will be readily apparent, the angle brackets 15, 15 may be adjusted in accordance with the width of the motor vehicle seat 14 on which the attachment is installed.

Rigidly secured to the top surface of the support plate 12 are a pair of tubular track members 19, 19, said tubular track members being formed at their top portions with longitudinal slots 20. The tubular track members 19, 19 are secured in parallel relationship, and adjacent and parallel to the respective front and rear margins of the rigid support plate 12, as is clearly shown in Figures 1 and 2. As is further shown in these figures, the slots 20 extend substantially for the major portions of the length of the respective tubular track members 19.

Designated at 21 is an auxiliary seat member which is generally similar in transverse cross sectional shape to the support plate 12, but is much shorter. Thus, the auxiliary seat member 21 comprises an auxiliary bottom plate 22 which follows the contour of the support plate 12, having a depending end flange 23. Secured on the rigid plate member 22 is a resilient cushion element 24 of suitable yieldable resilient material, such as sponge rubber or the like.

Designated at 25, 25 are respective cylindrical rod members which are slidably received in the respective track members 19, 19, said rod members being rigidly connected to the underside of the auxiliary plate member 22 by respective welds 26, as shown in Figure 3, or by any other suitable rigid connecting means adapted to pass through the slots 20 in the tubular track members 19. As shown in Figure 3, the rigid connecting elements 26 extend through the slots in the tubular track members 19 whereby the rod members 25 guide the auxiliary seat 21 along the track members 19, 19.

The plate element 22 of auxiliary seat 21 is formed at one edge thereof with a lug 28 in which is slidably mounted a vertically movable detent bolt 29 of conventional construction, said detent bolt being biased downwardly by suitable spring means, not shown. The lower end of the detent bolt 29 is engageable in a recess formed in a boss 30 provided on the top surface of the support plate 12, whereby the auxiliary seat 21 may be releasably locked in a position adjacent one end of the support plate 12, namely, the position adjacent the steering wheel of the vehicle when the device is installed on a vehicle front seat. The bolt 29 is provided with a finger grip portion 31 which may be grasped and which may be employed to elevate the bolt to disengage same from the recessed locking boss 30.

Journaled to the inside surface of the depending flange element 23 of plate 22 are a plurality of rollers 32 which are arranged vertically, as shown in Figure 3, and which engage against the depending front flange 13 of support plate 12, the rollers 32 being spaced along the flange 23 in the manner shown in dotted view in Figure 4 so as to bear against the flange 13 and provide guiding support for the auxiliary seat 21 as it is shifted laterally on the support plate 12.

Normally, the auxiliary seat 21 is locked in a position adjacent the steering wheel of the vehicle, so that the driver can sit on the auxiliary seat 21. When the driver wishes to shift his position laterally, for example, to leave the vehicle, he merely raises the locking bolt 29 by lifting the handle element 31, whereby the auxiliary seat 21 is unlocked, allowing the driver to shift his position laterally to the opposite side of the vehicle, so that he may readily leave the vehicle through the door at said opposite side. When the driver reenters the vehicle, he reverses the procedure, shifting the auxiliary seat 21 back to its original position, and allowing the auxiliary seat to be locked in said original position by means of the locking bolt 29, which engages in the recessed boss 30, as above described.

The rods 25 are preferably formed with spherical recesses in their under sides in which are received ball bearings 36, as shown in Figures 3 and 4, to facilitate free sliding movement of the rod members 25 in the slotted tubular tracks 19.

While a specific embodiment of an improved sliding seat attachment for a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A sliding seat attachment for a motor vehicle comprising a rigid support member shaped to fit over the seat portion of a motor vehicle seat and having a depending front flange, said support member being devoid of a back which would interfere with tilting of the back portion of a motor vehicle seat, depending rigid abutment members adjustably secured to the opposite ends of said support member and being engageable with the opposite ends of the seat portion of a vehicle seat to limit horizontal movement of the support member, a plurality of parallel track members secured longitudinally on said support member, an auxiliary seat member having a depending front flange located adjacent the first-named front flange, vertical rollers journaled to the second-named flange and engaging the first-named flange, and depending means on said auxiliary seat member slidably engaged with said track members, said auxiliary seat member being relatively short as compared with the length of said track members, whereby said auxiliary seat member is shiftable from one side of the support member to the other.

2. A sliding seat attachment for a motor vehicle comprising a rigid support member shaped to fit over a motor vehicle seat and having a depending front flange, depending rigid abutment members adjustably secured to the opposite ends of said support member and being engageable with the opposite ends of a vehicle seat to limit horizontal movement of the support member, a pair of longitudinally slotted parallel, tubular track members secured longitudinally on said support member, an auxiliary seat member having a depending front flange located adjacent the first-named front flange, vertical rollers journaled to the second-named flange and engaging the first-named flange, respective rod members slidably engaged in said tubular track members, ball bearings in the undersides of said rod members, means extending through the slots in said track members rigidly connecting said rod members to the undersides of said auxiliary seat member, said auxiliary seat member and rod members being relatively short as compared with the length of said track members, whereby said auxiliary seat member is shiftable from one side of the support member to the other, and cooperating manually controlled latch means on the auxiliary seat member and support member formed and arranged to releasably secure said auxiliary seat member adjacent one end of the support member.

References Cited in the file of this patent

UNITED STATES PATENTS

| 1,056,956 | Stewart | Mar. 25, 1913 |
| 2,324,207 | Gsell | July 13, 1943 |
| 2,615,493 | Hunter | Oct. 28, 1952 |

FOREIGN PATENTS

| 609,671 | Great Britain | Oct. 5, 1948 |